Patented Sept. 19, 1939

2,173,353

UNITED STATES PATENT OFFICE 2,173,353

GONAD-STIMULATING PRODUCT AND PROCESS OF PRODUCTION

Hubert R. Catchpole and William R. Lyons, Berkeley, Calif.; said Lyons assignor to said Catchpole No Drawing. Application December 23, 1935, Serial No. 55,838

2 Claims. (Cl. 167—74)

This invention relates in general to gonad-stimulating hormones and in particular to a gonad-stimulating hormone derived in a concentrated form from the placenta of pregnant mares obtained between the thirty-seventh day and the one hundred and thirtieth day of gestation.

Although gonad-stimulating hormones have been derived from the blood of pregnant mares there is no known method by which such hormones can be sufficiently freed of allergic reaction-producing substances to make a product suitable for human use.

The object of our invention is the provision of a concentrated gonad-stimulating hormone relatively free of allergic reaction-producing substances, and a method of deriving such a hormone.

As a result of assaying various tissues of the mare for their gonad-stimulating hormone-content we have discovered that the placentas of pregnant mares obtained between the thirty-seventh day and the one hundred and thirtieth day of gestation possess a very high content of a gonad-stimulating hormone, and that this hormone in its concentrated form may be recovered by a solvent extraction process relatively free of extraneous proteins. For the purpose of this application the placenta may be regarded as including the chorion embryotrophe, and the endometrium, and the embryotrophe as the secretion lying between the endometrium and the fetal sac. The period of pregnancy during which hormone exists abundantly in the placenta of a mare was found to be the same as disclosed in the Cole and Hart Patent #1,994,853 of March 19, 1935, namely, between the thirty-seventh day and the one hundred and thirtieth day of gestation. And as in the case of Cole and Hart the stages of pregnancy were estimated from fetal length rather than from an exact knowledge of the breeding dates.

Briefly the process employed by us in deriving a concentrated hormone from the placenta of pregnant mares comprises dissolving out the hormone from the placenta by the use of a solvent such as acetone; precipitating out the hormone from the solvent; washing and drying the precipitated hormone and then redissolving the dried hormone for use by injection. For example in preparing a quantity of hormone in accordance with our invention the following procedure was followed:

Preparation of extract

Six grams of fresh tissue were placed in 250 cc. of a mixture of 60 per cent acetone and 4 per cent ammonia. (This solution was prepared by mixing 600 cc. acetone and 140 cc. strong ammonia, and adding distilled water to make to 1 liter.) This first extract was allowed to proceed overnight, when the supernatant fluid was poured off and saved and the residual tissue ground up and extracted with a further 200 cc. solvent for 8 hours. The tissue was finally washed with acetone-ammonia solution and discarded. The total combined extracts were filtered through glass wool and to them added an equal volume of absolute acetone to bring the concentration of acetone in the mixture to 80 per cent. A flocculent precipitate, or a cloudy suspension that could be made to flocculate by the addition of a few drops of glacial acetic acid, was formed. It was separated by centrifugation, and the supernatant liquid discarded. The precipitate was stirred with 150 cc. acetone or alcohol and left overnight to dehydrate. The liquids were removed by centrifuging and replaced with 50 cc. absolute acetone. After the lapse of an hour, the precipitate was washed over to a small Buchner funnel, washed with acetone and dried with ether under suction. The product was a light brown or white granular substance that could be ground to a fine powder (to facilitate subsequent solution) with the flat of a knife. It was dried in vacuo and weighed. The acetone-ammonia powders were dissolved in 0.1 normal NaOH solution, and then adjusted to a pH of approximately 8.0 by the addition of 0.1 normal HCl. The total volume of solution was brought to 12.0 cc. by the addition of distilled water, thus giving preparations containing an equivalent of 500 mg. original tissue per 1.0 cc.

The same technique can apparently be used for recovering hormones from any hormone-bearing tissue. For example:

Mare hypophyses were reduced to powders in the same way, but using amounts of solvents proportionately smaller, corresponding to the average weight of the male anterior lobes, which was 1.0 gm. The hypophyseal acetone-ammonia powders were made into solutions containing 100 mg. original tissue per 1.0 cc.

Method of assay of hormone

For assay of the gonad-stimulating hormone as above prepared we have employed the 21 day old female rat. The effects of this hormone on the genital organs of such rodents are: (1) stimulation of follicular growth, (2) luteinization, with or without ovulation, (3) production of corpora hemorrhagica, (4) secondary oestrous effects in the uterus and vagina; these are the production of thickened or distended uteri filled with fluid and the cornification of the epithelial structures of the vagina, leading to premature opening of the vaginal orifice. In addition, there is the further reaction, (5) tremendous local increase in vascularity, that probably precedes the other effects in point of time, and that has claimed all too little attention hitherto.

Routinely we injected equivalents of 1000, 100, and 10 mg. of original wet tissue equivalents each to a group of three 21 day old female rats in a single dose, and autopsied at 120 hours. A number of tests conducted with mare serum showed that it was perfectly feasible to give this single administration of hormone, and obtain sensibly the same response in the test animals as with the same dose split into three and given on successive days. Cole et al. ('32) report a similar finding, which is undoubtedly bound up with the relative difficulty with which this hormone is excreted by the kidneys as compared with prolan and with oestrin.

Since our main criterion of activity was the production of large follicles or corpora, it was decided in our series to autopsy routinely at 120 hours. Under the above regime of treatment, there seems to be ample evidence that the ovary is at a point of maximal development on the fifth day, and that it thereafter regresses. At autopsy the pair of ovaries was weighed for each rat, and remarks made on vaginal opening, presence of large follicles, corpora lutea, and corpora hemorrhagica.

In some instances it was necessary to give doses of 1 mg., 0.1 mg., or less. Doses higher than 1000 mg. were occasionally given, but in this study we shall regard hormone as being absent when 1000 mg. doses of tissue fail to show activity, although not denying that hormone might be extracted from considerably larger amounts of tissue.

Results

The ovarian responses to the standard doses administered were intense. In a number of cases the middle dose level gave maximal reactions (250 to 300 mg. ovaries), while the high dose actually showed submaximal reactions, presumably due to some hurting effect on the animal. The reaction given by the low dosage of 10 mg. illustrated the potency of this material. Ovary weights as high as 180 mg., and frequently over 100 mg. were obtained. Such reactions have not been approached by the injection of many times this amount of potent mare sera, such as derived in accordance with the Cole and Goss Patent #2,007,328 and the Cole and Hart Patent #1,994,853, and a comparison of individual cases reveals ten- to one hundred-fold differences between placentae and corresponding potent sera preparations.

Some idea can be obtained as to the potency of the placental hormone forming the subject matter of our invention, by a comparison of the minimal dose required to produce at least one corpus luteum in a test rat of (1) a hormonal product such as derived in accordance with the Cole and Goss Patent #2,007,328, (2) raw untreated placental tissue such as we start out with in order to produce our concentrated product and (3) a placental product concentrated in accordance with our invention. In making this comparison we find that a minimal dose of from 0.1 mg. to 2.0 mgs. of the concentrated Cole and Goss product at least one corpus luteum in each of at least half of the treated rats; that a minimal dose of 0.1 mg. to 2.5 mg. of the raw untreated placental tissue will produce the same effect and that a minimal dose of 0.0018 mg. to 0.047 mg. of the placental product concentrated in accordance with our invention will produce the same result. It will therefore be observed that the hormonal concentration of the raw untreated placental tissue with which we start is substantially the same as the concentration of the final product derived by the Cole and Goss process and the placental product derived in accordance with our process is 40 to 50 times as concentrated as the final product derived by the Cole and Goss process.

We claim:

1. A gonad-stimulating product comprising: a precipitate derived from the placenta of a mare obtained between the thirty-seventh day and the one hundred and thirtieth day of gestation, said product being capable of stimulating and developing the gonads of males and females and being sufficiently free of allergic reaction producing substances to be suitable for human use.

2. A gonad-stimulating product comprising a precipitate derived from the placenta of a mare, obtained between the thirty-seventh and the one hundred thirtieth day of gestation, said product being capable of stimulating and developing the gonads of males and females.

HUBERT R. CATCHPOLE.
WILLIAM R. LYONS.